(12) United States Patent
Rambo et al.

(10) Patent No.: US 7,301,902 B2
(45) Date of Patent: Nov. 27, 2007

(54) GENERIC ON-CHIP HOMING AND RESIDENT, REAL-TIME BIT EXACT TESTS

(75) Inventors: Darwin Rambo, Surrey (CA); Phil Houghton, Surrey (CA)

(73) Assignee: Broadcom Corporation, Irvine, CA (US)

( * ) Notice: Subject to any disclaimer, the term of this patent is extended or adjusted under 35 U.S.C. 154(b) by 1022 days.

(21) Appl. No.: 10/378,366

(22) Filed: Mar. 3, 2003

(65) Prior Publication Data

US 2004/0174899 A1 Sep. 9, 2004

(51) Int. Cl.
*H04J 1/16* (2006.01)

(52) U.S. Cl. .................. 370/230; 370/329; 370/477; 375/253

(58) Field of Classification Search ............... 370/229, 370/230, 329, 341, 477; 375/350, 253
See application file for complete search history.

(56) References Cited

U.S. PATENT DOCUMENTS 6,904,110 B2 * 6/2005 Trans et al. ............... 375/350

FOREIGN PATENT DOCUMENTS

EP 0665442 A1 8/1995
EP 1289184 A1 3/2003

OTHER PUBLICATIONS

Digital Cellular Telecommunications system (Phase 2+);ETSI Standards, European Telecommunications Standards Institute; Sohpia-Antipo, FR, No. V200; Feb. 1999, XP014024562; ISSN: 0000-0001.
Digital Cellular Telecommunications system (Phase 2+); Internet Citation, [Online]; Mar. 1, 2001; XP002187428; Retrieved from Internet: URL:http://webapp.etsi.org/action%5CPU/20010717/ts_101713v070101p.pdf> [retrieved on Jan. 15, 2002].

* cited by examiner

*Primary Examiner*—John Pezzlo
(74) *Attorney, Agent, or Firm*—McAndrews, Held & Malloy, Ltd.

(57) ABSTRACT

Details of media encoding and decoding devices which support generic homing sequences, and methods for operating such devices are disclosed. The use of generic homing sequences may permit an embodiment of the disclosed invention to support real-time, bit-exact testing of existing and future media encoding and decoding devices. An embodiment of the present invention may permit the initialization of encoding and decoding algorithms to a known state, enabling bit-exact testing of a large group of devices using these algorithms, including those whose specifications do not support such functionality. This capability may permit the full-speed, bit-exact, testing of both locally and remotely situated media encoders and decoders.

16 Claims, 7 Drawing Sheets

GENERIC ON-CHIP HOMING AND RESIDENT, REAL-TIME BIT EXACT TESTS

CROSS-REFERENCE TO RELATED APPLICATIONS/INCORPORATION BY REFERENCE

[Not Applicable.]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

To an ever increasing degree, forms of human communication such as voice, music, and video are transported in compressed digital form, both in wired and wireless systems. The accuracy of the conversion of signals such as these to their compressed digital counterparts, and back again, is an important consideration in communication system development and operation. To help ensure the consistent reproduction of these signals, the encoding and decoding ("media coding") algorithms used are precisely defined in standards. For example, some of the standards which specify the behavior of a voice encoder or decoder ("vocoder") do so in terms of the expected vocoder digital output response to an input sequence of digital test vectors. A subset of vocoder implementations may be validated by first initializing the vocoder to a known state, and then verifying that the output bits of the encoder or decoder exactly match that defined by the applicable standard for each defined test vector. This method of testing is referred to as "bit exact" testing.

To enable bit-exact testing, the developers of some vocoder standards have incorporated the detection of a "homing sequence" into the encoder and decoder specifications. A homing sequence allows the encoder or decoder to be reset to a known "initial" or "starting" state. For example, the vocoders defined by International Telecommunications Union-Telecommunications Standardization Sector (ITU-T) Recommendation G.726, and the Global System for Mobile Communications (GSM) Adaptive Multi-Rate Transcoder standard (described in European Telecommunication Standards Institute (ETSI) EN 301 703) are examples of two vocoders that recognize homing sequences. Most vocoder standards currently in use, however, do not specify homing sequences, making real-time, bit-exact testing of the majority of vocoders a difficult task.

Vocoders are typically implemented as software processes running on a digital signal processor (DSP), and development and testing of vocoder software is generally done using an integrated circuit device ("chip") simulator. Such systems do not normally run at the full operating speed of the chip on which the vocoder algorithms will eventually be used. Because of this, many vocoder software implementations have not been fully verified while running in a real-time environment.

Complicating the testing of vocoder software is that fact that in use, a single vocoder device may encode and decode speech data for a large number of voice channels, where each voice channel is processed using any one of a number of different vocoder standards. At any point in time, each encoder or decoder algorithm may be in any one of a number of states, which makes complete testing of a vocoder system designed to support tens or even hundreds of voice channels an extremely difficult task. When software problems are suspected, it may be difficult to reproduce the exact software state in which the error occurs due to the vast number of variables involved, and the difficulty of testing the system under normal operating conditions.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the disclosed invention relate in general to the broad subject matter of media coders (encoders and decoders) for use in digital communication systems. More specifically, certain embodiments of the invention relate to methods of operating a packet communication system in which a generic homing sequence is used to enable encoder and decoder control, and bit-exact testing of all encoders and decoders supported by the system, rather than only those for which native homing sequences have been defined.

Aspects of the present invention may be seen in a media encoding device comprising a sequence detector, a selector and an encoder. The sequence detector recognizes the occurrence of a predefined data sequence in a data stream, and produces a detect signal upon recognition of the predefined data sequence. The selector passes one of at least a first data stream and a second data stream to an output stream, and has a control input for controlling the selection. The control input is operatively coupled to the detect signal of the sequence detector. The encoder converts an input data stream in a first representation to an output data stream in a second representation, and has a reset input operatively coupled to the detect signal of the sequence detector. The first data stream may comprise data representative of human speech, the second data stream may comprise a test data stream, and the encoder output stream may comprise compressed speech data. The encoder output may be compliant with at least one of the ITU-T G.726 speech encoder specification, the ITU-T G.723.1 speech encoder specification, and ETSI EN 301 703 Adaptive Multi-Rate speech encoder specification.

The sequence detector, in an embodiment in accordance with the present invention, may further comprise an enable input for enabling the recognition of the predefined data sequence, and the sequence detector may produce a second detect signal upon recognition of a subsequent occurrence of the predefined sequence immediately following recognition of a prior occurrence of the predefined sequence. The media coder may also comprise an output store for capturing the encoder output data stream for a predetermined interval following the occurrence of the detect signal.

Aspects of the present invention may also be seen in a media decoding device comprising a sequence detector, a selector and an encoder. The sequence detector recognizes the occurrence of a predefined data sequence in a data stream, and produces a detect signal upon recognition of the predefined data sequence. The selector passes one of at least a first data stream and a second data stream to an output stream, and has a control input for controlling the selection. The control input is operatively coupled to the detect signal of the sequence detector. The decoder converts an input data stream in a first representation to an output data stream in a second representation, and has a reset input operatively coupled to the detect signal of the sequence detector. In an embodiment of the present invention, the first data stream may comprise compressed speech data, the second data stream may comprise a test data stream, and the decoder output stream may comprise data representative of human speech. The decoder input may be compliant with at least one of the ITU-T G.726 speech decoder specification, the ITU-T G.723.1 speech decoder specification, and the ETSI EN 301 703 Adaptive Multi-Rate speech encoder specification.

In another embodiment in accordance with the present invention, the sequence detector may comprise an enable input for enabling the recognition of the predefined data sequence, and the sequence detector may produce a second detect signal upon recognition of a subsequent occurrence of the predefined sequence immediately following recognition of a prior occurrence of the predefined sequence. The media coder may also comprise an output store for capturing the decoder output data stream for a predetermined interval following the occurrence of the detect signal.

Another aspect of the present invention may be observed in a method of operating a media coder. The method comprises receiving a first media stream; comparing the first media stream with a predefined data sequence; processing the first media stream if the comparison indicates that the first media stream does not correspond to the predefined data sequence; and refraining from processing the first media stream if the comparison indicates that the first media stream does correspond to the predefined data sequence. In an embodiment of the present invention, the comparison may indicate that the first media stream corresponds to the predefined data sequence if the first media stream is substantially identical to the predefined data sequence. In an embodiment in accordance with the present invention, the processing may comprise encoding the first media stream to produce a second media stream; and transmitting the second media stream, where the second media stream may comprise compressed human speech. In addition, the refraining may comprise resetting an encoding device, encoding a test data stream; and capturing the encoded test data stream.

In yet another embodiment of the present invention, the processing may comprise decoding the first media stream to produce a second media stream, and transmitting the second media stream, where the first media stream may comprise compressed human speech. The refraining in such an embodiment may comprise resetting a decoding device, decoding a test data stream, and capturing the decoded test data stream.

A further embodiment of the present invention may include machine-readable storage, having stored thereon a computer program having a plurality of code sections executable by a machine for causing the machine to perform the foregoing.

These and other advantages, aspects, and novel features of the present invention, as well as details of illustrated embodiments, thereof, will be more fully understood from the following description and drawings.

DETAILED DESCRIPTION OF THE INVENTION

The following detailed description is related to the bit-exact testing of voice encoders and decoders functioning within an operating communication system. Embodiments of the present invention may permit the verification of media coder operations during system development as well during operation in customer networks. Although the embodiments described below are with respect to the use of the invention(s) in systems performing voice encoding and decoding, the embodiments described herein are for illustrative purposes only, as the present invention is not limited in this respect, and may be equally applicable to media coders in general.

Figure 1:
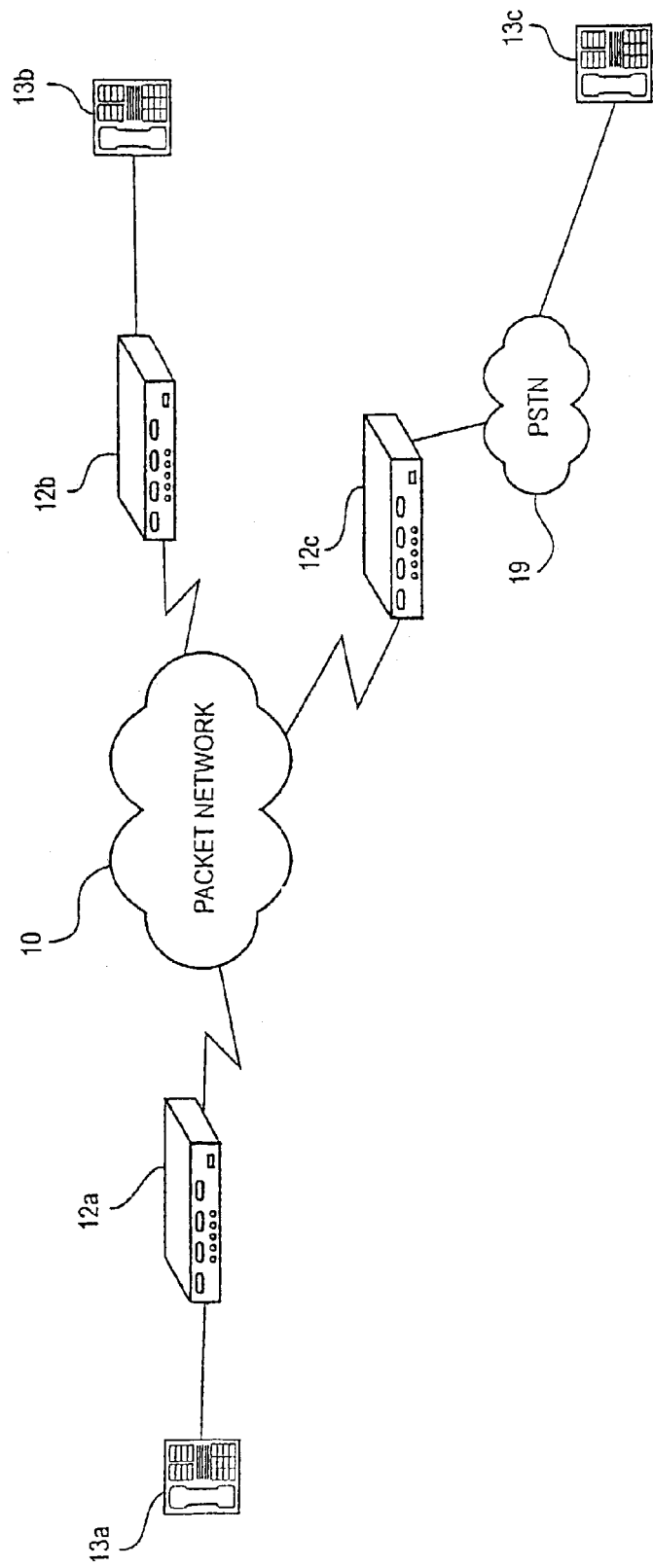
FIG. 1 is a block diagram of a packet voice network in which an embodiment in accordance with the present invention may be practiced.

Referring now to FIG. 1, there is shown a functional block diagram representing a communication system that enables the transmission of voice data over a packet-based system such as voice-over-IP (VoIP, H.323), Voice over Frame Relay (VOFR, FRF-11), Voice Telephony over ATM (VTOA), or any other proprietary network, according to an illustrative embodiment of the present invention. In one embodiment of the present invention, voice data can also be carried over traditional media such as time division multiplex (TDM) networks and voice storage and playback systems. Packet-based network 10 provides a communication medium between telephony devices. Network gateways 12a and 12b support the exchange of voice between packet-based network 10 and telephony devices 13a and 13b. Network gateways 12a and 12b may include a signal processing system that provides an interface between the packet-based network 10 and telephony devices 13a and 13b. Network gateway 12c supports the exchange of voice between packet-based network 10 and a traditional circuit-switched network 19, which transmits voice data between packet-based network 10 and telephony device 13c. In the described exemplary embodiment, each network gateway 12a, 12b, 12c supports a telephony device 13a, 13b, 13c.

Each network gateway 12a, 12b, 12c could support a variety of different telephony arrangements. By way of example, each network gateway might support any number of telephony devices, circuit-switched networks and/or packet-based networks including, among others, analog telephones, Ethernet phones, fax machines, data modems, PSTN lines (Public Switched Telephone Network), ISDN lines (Integrated Services Digital Network), T1 systems, PBXs, key systems, or any other conventional telephony device and/or circuit-switched/packet-based network. In the described exemplary embodiment, two of the network gateways 12a, 12b provide a direct interface between their respective telephony devices and the packet-based network 10. The other network gateway 12c is connected to its respective telephony device through a circuit-switched network such as a PSTN 19. The network gateways 12a, 12b, 12c permit voice, fax and modem data to be carried over packet-based networks such as PCs running through a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x), or GSM for terrestrial wireless applications, or any other packet-based system.

Figure 1A:
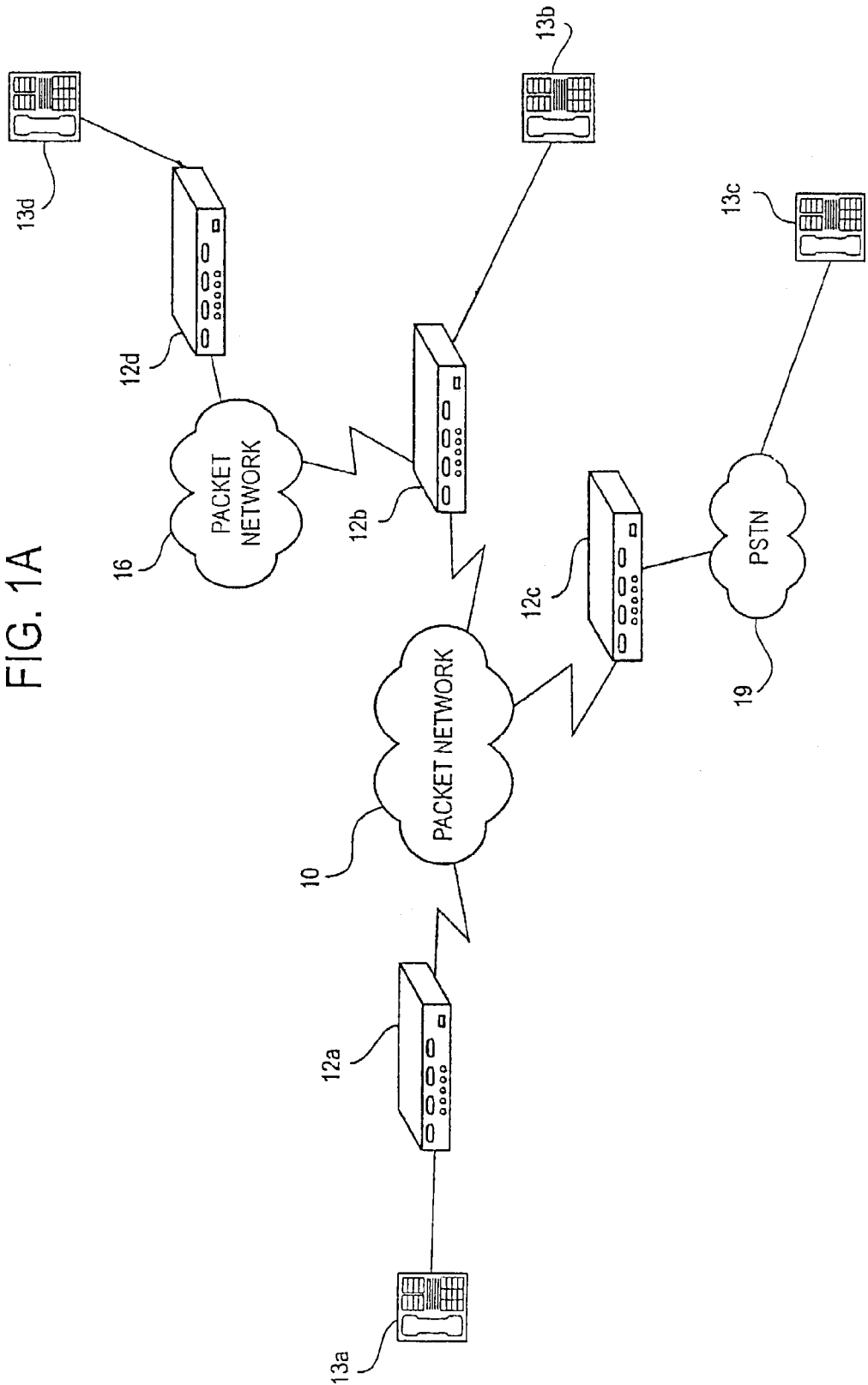
FIG. 1A is a block diagram of another packet voice network in which an embodiment in accordance with the present invention may be practiced.

Another exemplary topology is shown in FIG. 1A. The topology of FIG. 1A is similar to that of FIG. 1 but includes a second packet-based network 16 that is connected to packet-based network 10 and to telephony device 13b via network gateway 12b. The signal processing system of network gateway 12b provides an interface between packet-based network 10 and packet-based network 16 in addition to an interface between packet-based networks 10, 16 and telephony device 13b. Network gateway 12d includes a signal processing system that provides an interface between packet-based network 16 and telephony device 13d.

Figure 2:
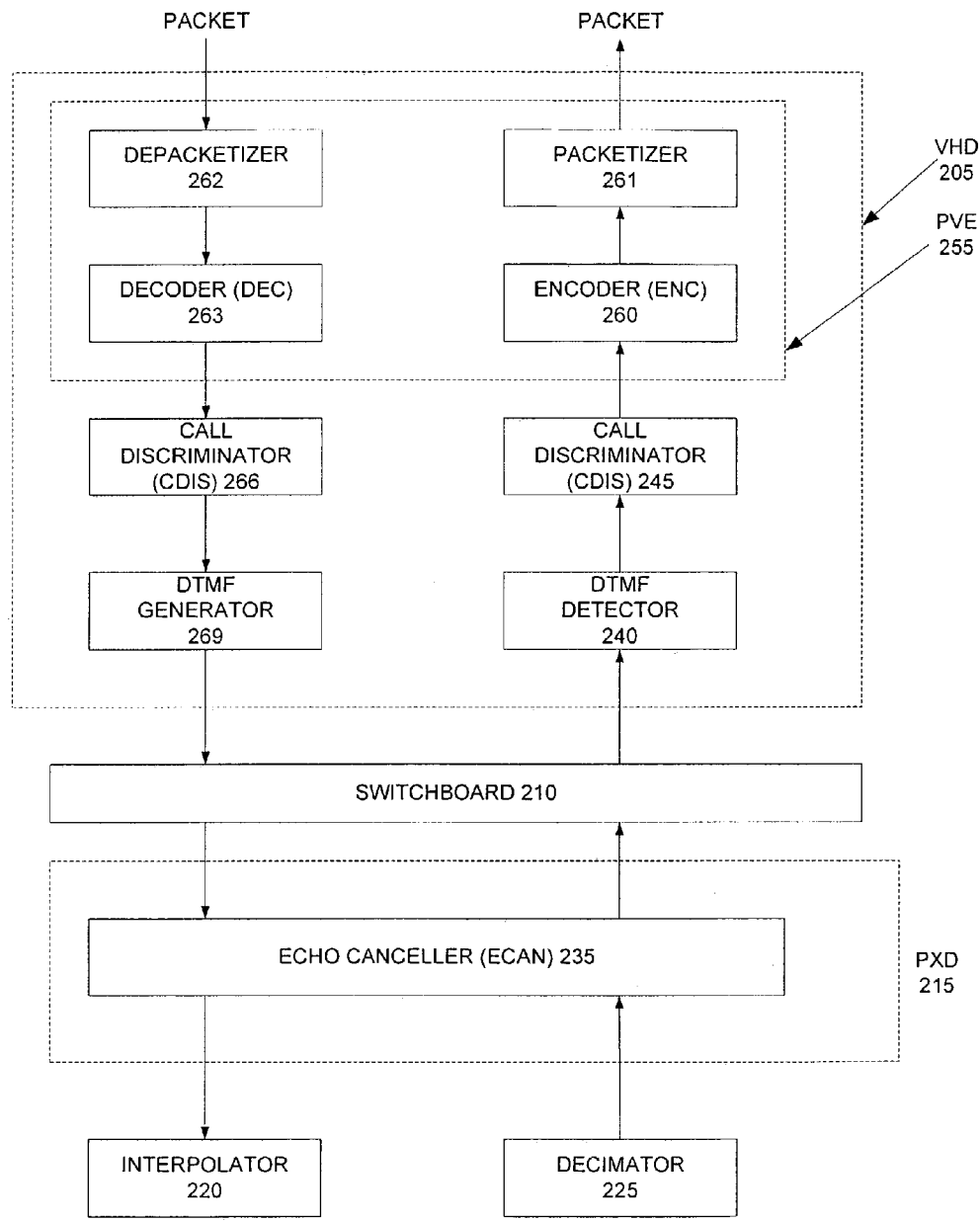
FIG. 2 shows a block diagram of the speech data processing functionality that may be present in an embodiment in accordance with the present invention.

Referring now to FIG. 2, there is illustrated a signal flow diagram of a packet voice transceiver system 200, in accordance with an embodiment of the present invention. In an illustrative embodiment of the present invention, the packet voice transceiver system 200 may reside in a network gateway such as network gateways 12a, 12b, 12c of FIG. 1, and 12a, 12b, 12c, and 12d of FIG. 1A. In an exemplary embodiment, packet voice transceiver system 200 provides two-way communication with a telephone or a circuit-switched network, such as a PSTN line (e.g. DS0). The packet voice transceiver 200 includes a Virtual Hausware Driver (VHD) 205, a switchboard 210, a physical device driver (PXD) 215, an interpolator 220, and a decimator 225.

The VHD 205 is a logical interface to a telephony device such as 13a, 13b, and 13c of FIG. 1, via the packet network 10, and performs functions such as voice encoding and decoding, media queue management, dual tone multi-frequency (DTMF) detection and generation, and call discrimination (CDIS). During a communication session (e.g., voice, video, fax) each telephony device associates a VHD 205 with each of the telephony device(s) with which it is communicating. For example, during a voice-over-packet (VoIP) network call between telephony devices 13a and 13b, telephony device 13a associates a VHD 205 with telephony device 13b, and telephony device 13b associates a VHD 205 with telephony device 13a. Communication between telephony devices 13a and 13b takes place through their respective VHD205, and packet network 10.

The switchboard 210 associates the VHD 205 and the PXD 215 engaged in a communication session by supporting the connection and combination of data streams from the VHD205 and PXD215 assigned to the telephony devices participating in the session.

The PXD 215 represents an interface for transmitting and receiving the input and output signals to and from the user, and performs various functions including, for example, echo cancellation. As shown in FIG. 2, the top of the PXD 215 interfaces with switchboard 210, while the bottom of the PXD 215 passes data to the interpolator 220 and receives data from decimator 225. The functions within a wideband PXD 215 may be designed to use, for example, 16 kHz sampled data, while functions in a narrowband PXD 215 may expect to process, for example, 8 kHz sampled data.

A wideband system may contain a mix of narrowband and wideband VHDs 205 and PXDs 215. A difference between narrowband and wideband device drivers is their ingress and egress sample buffer interface. A wideband VHD 205 or PXD 215 has wideband data at its sample buffer interface and includes wideband services and functions. A narrowband VHD 205 or PXD 215 has narrowband data at its sample buffer interface and can include narrowband services and functions. The switchboard interfaces with narrowband and wideband VHDs 205 and PXDs 215 through their sample buffer interfaces. The switchboard 210 is incognizant of the wideband or narrowband nature of the device drivers, but is aware of the sampling rate of the data that it reads and writes data through the sample buffer interfaces. To accommodate differences in the sampling rates of data streams, an embodiment of the present invention may upsample data received from narrowband sources and downsample data being sent to narrowband destinations. The sample buffer interfaces may provide data at any arbitrary sampling rate. In an embodiment of the present invention, the narrowband sample buffer interface may provide data sampled at 8 kHz and the wideband sample buffer interface may provide data sampled at 16 kHz. Additionally, a VHD 205 may be dynamically changed between wideband and narrowband and vice versa.

The VHD 205 and PXD 215 driver structures may include sample rate information to identify the sampling rates of the wideband and narrowband data. The information may be part of the interface structure that the switchboard understands and may contain a buffer pointer and an enumeration constant or the number of samples to indicate the sample rate.

The packet voice transceiver system 200 is also characterized by an ingress path and an egress path, in which the ingress path transmits user packets to a packet network such as, for example, packet network 10 of FIG. 1, and the egress path receives user packets from a packet network such as, for example, packet network 10 of FIG. 1. The ingress path and the egress path can either operate in a wideband support mode or a narrowband support mode, and the ingress path and the egress path are not required to operate in the same mode. For example, the ingress path can operate in the wideband support mode, while the egress path operates in the narrowband mode.

In the exemplary embodiment shown in FIG. 2, the ingress path comprises the decimator 225, echo canceller 235, switchboard 210, and services including but not limited to DTMF detector 240 and CDIS 245, and packet voice engine (PVE) 255 comprising an encoder algorithm 260, and packetization function 261. In the ingress path of a wideband device, the decimator 225 receives the user inputs and provides, for example, 16 kHz sampled data for an 8 kHz band-limited signal. The 16 kHz sampled data is transmitted through echo canceller 235 and switchboard 210 to the VHD 205 associated with the destination telephony device. In some cases, the DTMF detector 240 may be designed for operation on only narrowband digitized samples, and the wideband data may be downsampled and passed to DTMF detector 240. Similarly, where CDIS 245 is designed for operation on only narrowband digitized samples, downsampled wideband data may be provided to CDIS 245, which distinguishes a voice call from a facsimile transmission.

The PVE 255 is responsible for issuing media queue mode change commands consistent with the active voice encoder and decoder. The media queues can comprise, for example, the media queues described in patent application Ser. No. 10/313,826, "Method and System for an Adaptive Multimode Media Queue", filed Dec. 6, 2002, which is incorporated herein by reference in its entirety. The PVE 255 ingress thread receives raw samples from other functions within VHD 205. Depending upon the operating mode of VHD 205, the raw samples include either narrowband or wideband data. At PVE 255, encoder 260 encodes and packetizes the sampled data into compressed speech frames for transmission over a packet network such as, for example, packet network 10 of FIG. 1. The encoder 260 can comprise, for example, the BroadVoice 32 Encoder made by Broadcom, Inc.

The egress path comprises depacketizer 262, decoder 263, CDIS 266, DTMF generator 269, switchboard 210, echo canceller 235, and interpolator 220. The depacketizer 262 receives data packets from a packet network such as, for example packet network 10 or FIG. 1, passing the compressed speech frames to the decoder 263. The decoder 263 can comprise, for example, the BroadVoice 32 decoder made by Broadcom, Inc. The decoder 263 decodes the compressed speech frames received from the depacketizer 262 and may provide wideband sampled data. If CDIS 266 and DTMF generator support 16 kHz sampled data, the 16 kHz sampled is provided to CDIS 266 and DTMF generator 269. Again, in one embodiment, where CDIS 266 and DTMF generator 269 require narrowband digitized samples, the wideband data may be downsampled and used by CDIS 266 and the DTMF generator 269.

The DTMF generator 269 generates DTMF tones if detected in the data packets received from the sending telephony device 13*a*, 13*b*, and 13*c*. These tones may be written to the wideband data to be passed to switchboard 210. The wideband data is received by the switchboard 210, which provides the data to the PXD 215. The sampled data is passed through the echo canceller 235 and provided to interpolator 220.

Figure 3:
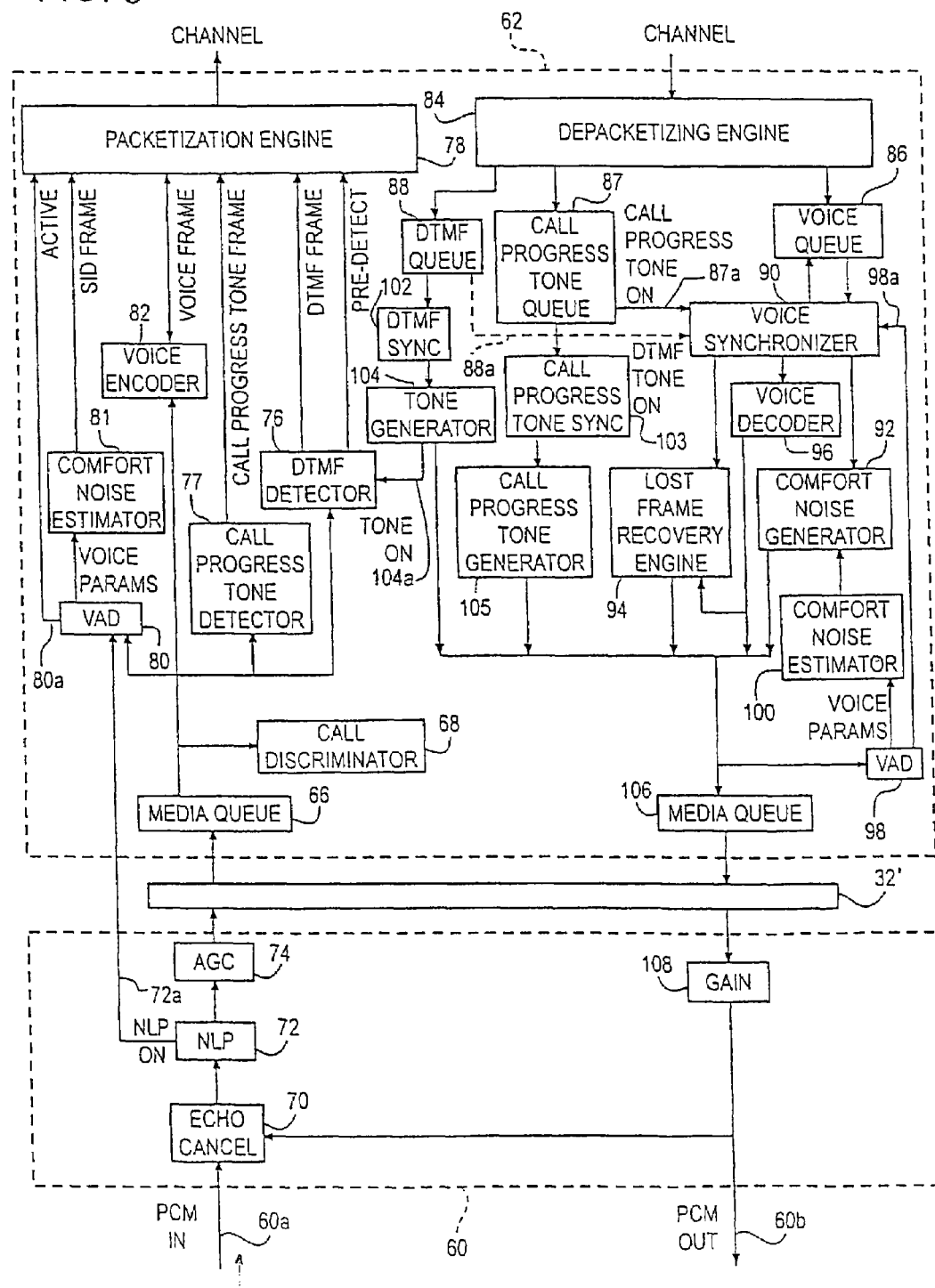
FIG. 3 illustrates an embodiment in which multiple vocoders are supported, in accordance with the present invention.

The services invoked by the network VHD in the voice mode and the associated PXD are shown schematically in FIG. 3. In the described exemplary embodiment, the PXD 60 provides two-way communication with a telephone or a circuit-switched network, such as a PSTN line (e.g. DS0) carrying a 64 kb/s pulse code modulated (PCM) signal, i.e., digital voice samples.

The incoming PCM signal 60*a* is initially processed by the PXD 60 to remove far-end echoes that might otherwise be transmitted back to the far-end user. As the name implies, echoes in telephone systems are the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loudly they are talking, and indeed, without side-tone, users tend to talk too loudly. However, far-end echo delays of more than about 10 to 30 msec significantly degrade the voice quality and are a major annoyance to the user.

An echo canceller 70 is used to remove echoes from far-end speech present on the incoming PCM signal 60*a* before routing the incoming PCM signal 60*a* back to the far-end user. The echo canceller 70 samples an outgoing PCM signal 60*b* from the far-end user, filters it, and combines it with the incoming PCM signal 60*a*. Preferably, the echo canceller 70 is followed by a non-linear processor (NLP) 72 which may mute the digital voice samples when far-end speech is detected in the absence of near-end speech. The echo canceller 70 may also inject comfort noise which in the absence of near-end speech may be roughly at the same level as the true background noise or at a fixed level.

After echo cancellation, the power level of the digital voice samples is normalized by an automatic gain control (AGC) 74 to ensure that the conversation is of an acceptable loudness. Alternatively, the AGC can be performed before the echo canceller 70. However, this approach would entail a more complex design because the gain would also have to be applied to the sampled outgoing PCM signal 60*b*. In the described exemplary embodiment, the AGC 74 is designed to adapt slowly, although it should adapt fairly quickly if overflow or clipping is detected. The AGC adaptation should be held fixed if the NLP 72 is activated.

After AGC, the digital voice samples are placed in the media queue 66 in the network VHD 62 via the switchboard 32'. In the voice mode, the network VHD 62 invokes three services, namely call discrimination, packet voice exchange, and packet tone exchange. The call discriminator 68 analyzes the digital voice samples from the media queue to determine whether a 2100 Hz tone, a 1100 Hz tone or V.21 modulated HDLC flags are present. If either tone or HDLC flags are detected, the voice mode services are terminated and the appropriate service for fax or modem operation is initiated. In the absence of a 2100 Hz tone, a 1100 Hz tone, or HDLC flags, the digital voice samples are coupled to the encoder system which includes a voice encoder 82, a voice activity detector (VAD) 80, a comfort noise estimator 81, a DTMF detector 76, a call progress tone detector 77 and a packetization engine 78.

Typical telephone conversations have as much as sixty percent silence or inactive content. Therefore, high bandwidth gains can be realized if digital voice samples are suppressed during these periods. A VAD 80, operating under the packet voice exchange, is used to accomplish this function. The VAD 80 attempts to detect digital voice samples that do not contain active speech. During periods of inactive speech, the comfort noise estimator 81 couples silence identifier (SID) packets to a packetization engine 78. The SID packets contain voice parameters that allow the reconstruction of the background noise at the far end.

From a system point of view, the VAD 80 may be sensitive to the change in the NLP 72. For example, when the NLP 72 is activated, the VAD 80 may immediately declare that voice is inactive. In that instance, the VAD 80 may have problems tracking the true background noise level. If the echo canceller 70 generates comfort noise during periods of inactive speech, it may have a different spectral characteristic from the true background noise. The VAD 80 may detect a change in noise character when the NLP 72 is activated (or deactivated) and declare the comfort noise as active speech. For these reasons, the VAD 80 should generally be disabled when the NLP 72 is activated. This is accomplished by a "NLP on" message 72*a* passed from the NLP 72 to the VAD 80.

The voice encoder 82, operating under the packet voice exchange, can be a straight 16-bit PCM encoder or any voice encoder which supports one or more of the standards promulgated by ITU. The encoded digital voice samples are formatted into a voice packet (or packets) by the packetization engine 78. These voice packets are formatted according to an applications protocol and sent to the host (not shown). The voice encoder 82 is invoked only when digital voice samples with speech are detected by the VAD 80. Since the packetization interval may be a multiple of an encoding interval, both the VAD 80 and the packetization engine 78 should cooperate to decide whether or not the voice encoder 82 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 80 passing an "active" flag 80a to the packetization engine 78, and the packetization engine 78 controlling whether or not the voice encoder 82 is invoked.

In the described exemplary embodiment, the VAD 80 is applied after the AGC 74. This approach provides optimal flexibility because both the VAD 80 and the voice encoder 82 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated herein by reference as though set forth in full herein.

Operating under the packet tone exchange, a DTMF detector 76 determines whether or not there is a DTMF signal present at the near end. The DTMF detector 76 also provides a pre-detection flag 76a which indicates whether or not it is likely that the digital voice sample might be a portion of a DTMF signal. If so, the pre-detection flag 76a is relayed to the packetization engine 78 instructing it to begin holding voice packets. If the DTMF detector 76 ultimately detects a DTMF signal, the voice packets are discarded, and the DTMF signal is coupled to the packetization engine 78. Otherwise the voice packets are ultimately released from the packetization engine 78 to the host (not shown). The benefit of this method is that there is only a temporary impact on voice packet delay when a DTMF signal is pre-detected in error, and not a constant buffering delay. Whether voice packets are held while the pre-detection flag 76a is active could be adaptively controlled by the user application layer.

Similarly, a call progress tone detector 77 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 77 monitors the call progress state, and forwards a call progress tone signal to the packetization engine to be packetized and transmitted across the packet based network. The call progress tone detector may also provide information regarding the near end hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 62 essentially performs the inverse operation of the encoding system. The decoding system of the network VHD 62 comprises a de-packetizing engine 84, a voice queue 86, a DTMF queue 88, a precision tone queue 87, a voice synchronizer 90, a DTMF synchronizer 102, a precision tone synchronizer 103, a voice decoder 96, a VAD 98, a comfort noise estimator 100, a comfort noise generator 92, a lost packet recovery engine 94, a tone generator 104, and a precision tone generator 105.

The de-packetizing engine 84 identifies the type of packets received from the host (i.e., voice packet, DTMF packet, call progress tone packet, SID packet), transforms them into frames which are protocol independent. The de-packetizing engine 84 then transfers the voice frames (or voice parameters in the case of SID packets) into the voice queue 86, transfers the DTMF frames into the DTMF queue 88 and transfers the call progress tones into the call progress tone queue 87. In this manner, the remaining tasks are, by and large, protocol independent.

A jitter buffer is utilized to compensate for network impairments such as delay jitter caused by packets not arriving with the same relative timing in which they were transmitted. In addition, the jitter buffer compensates for lost packets that occur on occasion when the network is heavily congested. In the described exemplary embodiment, the jitter buffer for voice includes a voice synchronizer 90 that operates in conjunction with a voice queue 86 to provide an isochronous stream of voice frames to the voice decoder 96.

Sequence numbers embedded into the voice packets at the far end can be used to detect lost packets, packets arriving out of order, and short silence periods. The voice synchronizer 90 can analyze the sequence numbers, enabling the comfort noise generator 92 during short silence periods and performing voice frame repeats via the lost packet recovery engine 94 when voice packets are lost. SID packets can also be used as an indicator of silent periods causing the voice synchronizer 90 to enable the comfort noise generator 92. Otherwise, during far-end active speech, the voice synchronizer 90 couples voice frames from the voice queue 86 in an isochronous stream to the voice decoder 96. The voice decoder 96 decodes the voice frames into digital voice samples suitable for transmission on a circuit switched network, such as a 64 kb/s PCM signal for a PSTN line. The output of the voice decoder 96 (or the comfort noise generator 92 or lost packet recovery engine 94 if enabled) is written into a media queue 106 for transmission to the PXD 60.

The comfort noise generator 92 provides background noise to the near-end user during silent periods. If the protocol supports SID packets, (and these are supported for VTOA, FRF-11, and VoIP), the comfort noise estimator at the far-end encoding system should transmit SID packets. Then, the background noise can be reconstructed by the near-end comfort noise generator 92 from the voice parameters in the SID packets buffered in the voice queue 86. However, for some protocols, namely, FRF-11, the SID packets are optional, and other far-end users may not support SID packets at all. In these systems, the voice synchronizer 90 continues to operate properly. In the absence of SID packets, the voice parameters of the background noise at the far end can be determined by running the VAD 98 at the voice decoder 96 in series with a comfort noise estimator 100.

Preferably, the voice synchronizer 90 is not dependent upon sequence numbers embedded in the voice packet. The voice synchronizer 90 can invoke a number of mechanisms to compensate for delay jitter in these systems. For example, the voice synchronizer 90 can assume that the voice queue 86 is in an underflow condition due to excess jitter and perform packet repeats by enabling the lost frame recovery engine 94. Alternatively, the VAD 98 at the voice decoder 96 can be used to estimate whether or not the underflow of the voice queue 86 was due to the onset of a silence period or due to packet loss. In this instance, the spectrum and/or the energy of the digital voice samples can be estimated and the result 98*a* fed back to the voice synchronizer 90. The voice synchronizer 90 can then invoke the lost packet recovery engine 94 during voice packet losses and the comfort noise generator 92 during silent periods.

When DTMF packets arrive, they are de-packetized by the de-packetizing engine 84. DTMF frames at the output of the de-packetizing engine 84 are written into the DTMF queue 88. The DTMF synchronizer 102 couples the DTMF frames from the DTMF queue 88 to the tone generator 104. Much like the voice synchronizer, the DTMF synchronizer 102 is employed to provide an isochronous stream of DTMF frames to the tone generator 104. Generally speaking, when DTMF packets are being transferred, voice frames should be suppressed. To some extent, this is protocol dependent. However, the capability to flush the voice queue 86 to ensure that the voice frames do not interfere with DTMF generation is desirable. Essentially, old voice frames which may be queued are discarded when DTMF packets arrive. This will ensure that there is a significant gap before DTMF tones are generated. This is achieved by a "tone present" message 88*a* passed between the DTMF queue and the voice synchronizer 90.

The tone generator 104 converts the DTMF signals into a DTMF tone suitable for a standard digital or analog telephone. The tone generator 104 overwrites the media queue 106 to prevent leakage through the voice path and to ensure that the DTMF tones are not too noisy.

There is also a possibility that DTMF tone may be fed back as an echo into the DTMF detector 76. To prevent false detection, the DTMF detector 76 can be disabled entirely (or disabled only for the digit being generated) during DTMF tone generation. This is achieved by a "tone on" message 104*a* passed between the tone generator 104 and the DTMF detector 76. Alternatively, the NLP 72 can be activated while generating DTMF tones.

When call progress tone packets arrive, they are de-packetized by the de-packetizing engine 84. Call progress tone frames at the output of the de-packetizing engine 84 are written into the call progress tone queue 87. The call progress tone synchronizer 103 couples the call progress tone frames from the call progress tone queue 87 to a call progress tone generator 105. Much like the DTMF synchronizer, the call progress tone synchronizer 103 is employed to provide an isochronous stream of call progress tone frames to the call progress tone generator 105. And much like the DTMF tone generators when call progress tone packets are being transferred, voice frames should be suppressed. To some extent, this is protocol dependent. However, the capability to flush the voice queue 86 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 87*a* passed between the call progress tone queue 87 and the voice synchronizer 90.

The call progress tone generator 105 converts the call progress tone signals into a call progress tone suitable for a standard digital or analog telephone. The call progress tone generator 105 overwrites the media queue 106 to prevent leakage through the voice path and to ensure that the call progress tones are not too noisy.

The outgoing PCM signal in the media queue 106 is coupled to the PXD 60 via the switchboard 32'. The outgoing PCM signal is coupled to an amplifier 108 before being outputted on the PCM output line 60*b*.

Figure 4:
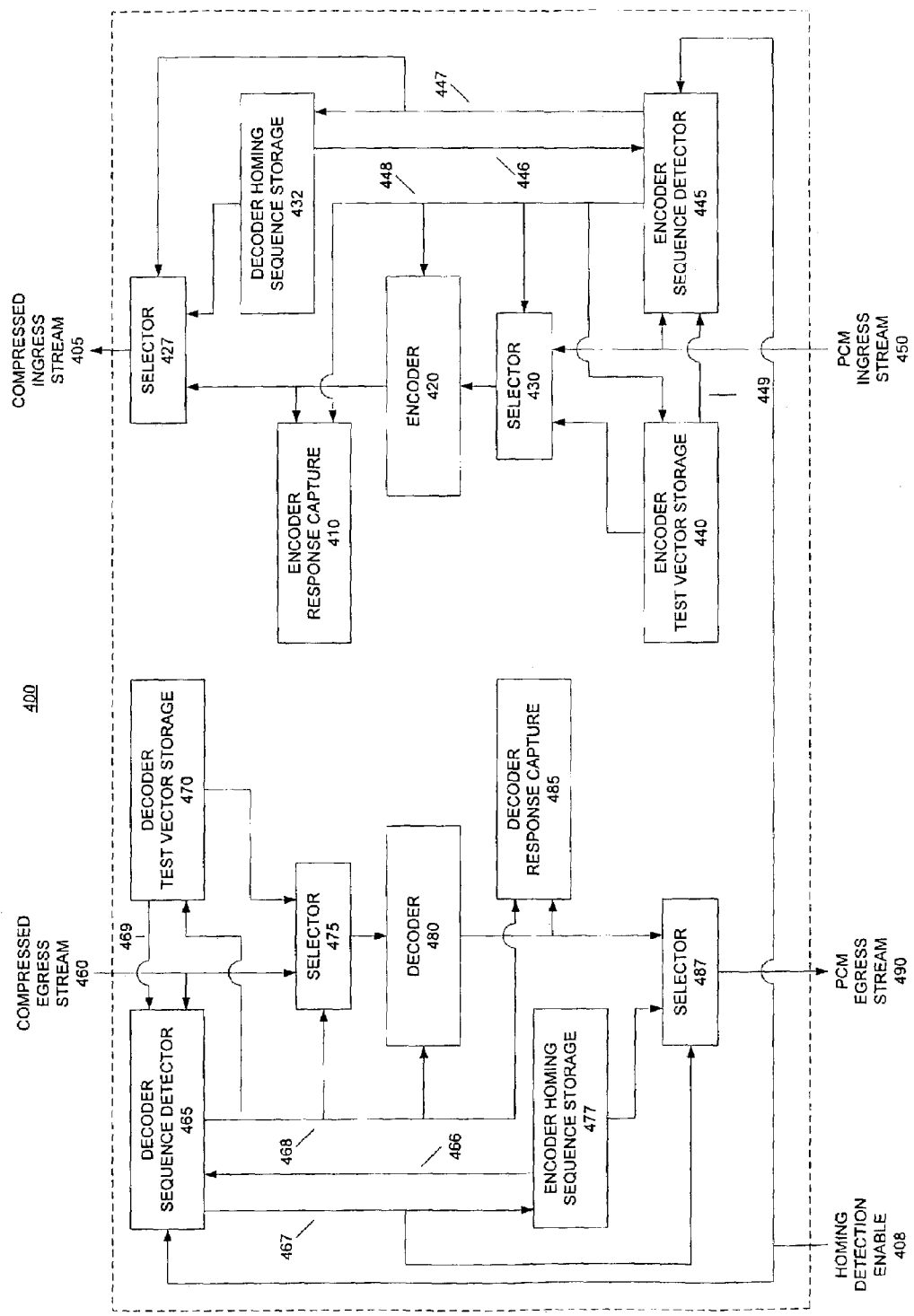
FIG. 4 is a block diagram showing a vocoder arrangement supporting a generic homing sequence, in accordance with the present invention.

FIG. 4 shows a block diagram of illustrating the functionality that may be contained within the PVE 400, in accordance with an embodiment of the present invention. PVE 400 may correspond to, for example, PVE 255 of FIG. 2. As shown in the illustration, PVE 400 has an egress path that receives speech frames from compressed egress stream 460, producing PCM egress stream 490, and an ingress path which receives speech data via PCM ingress stream 450, generating compressed speech frames transmitted via compressed ingress stream 405.

In the exemplary embodiment shown in FIG. 4, the egress path of PVE 400 passes compressed speech frames from the compressed egress stream 460 to the decoder sequence detector 465 and the selector 475. Under normal conditions, the decoder loopback detect signal 467 and the egress homing sequence detection signal 468 from the decoder sequence detector 465 are in an inactive state. The inactive state of egress homing sequence detection signal 468 causes the selector 475 to pass unchanged, the data from the compressed egress stream 460 to the decoder 480. The decoder 480 may correspond to, for example, the decoder 263 as shown in FIG. 2, or the decoder 96 of FIG. 3. The decoder 480 processes the incoming compressed speech frames according to any of a variety of decoding algorithms including, for example, those specified by the ITU-T G.711, G.723.1, G.726, G.728, or G.729 vocoder specifications. It may also implement any of, for example, the GSM Full Rate (GSMFR), Enhanced Full Rate (GSMEFR), or Adaptive Multi-Rate (AMR) vocoder specifications, the Enhanced Variable Rate Coder (EVRC), or the BroadVoice 16 or BroadVoice 32 vocoder specifications of Broadcom, Inc. In the exemplary embodiment, decoder 480 produces linear PCM speech data. The inactive state of decoder loopback detection signal 467 configures selector 487 to pass the linear PCM speech data, unchanged, to PCM egress stream 490. The PCM egress stream 490 may then be processed by the remaining functions shown in the VHD 205 of FIG. 2. The decoder test vector storage 470 and the decoder response capture 485 are disabled by the inactive state of the egress homing sequence detection signal 468 from the decoder sequence detector 465.

If enabled by the homing detection enable signal 408, the decoder sequence detector 465 compares the speech data within the compressed egress stream 460 to a predefined decoder homing sequence. The decoder homing sequence is a selected string of data values that have a low or zero probability of sequential occurrence within normal speech data. Upon the first detection of the decoder homing sequence, the decoder sequence detector 465 activates the egress homing sequence detection signal 468. Activation of the egress homing sequence detection signal 468 resets the decoder 480, returning the algorithm within the decoder 480 to its initial or 'starting' state. In addition, activation of the egress homing sequence detection signal 468 enables the decoder test vector storage 470 to begin generating the test vector data sequence appropriate for the decoding algorithm implemented by the decoder 480, and configures the selector 475 to begin passing data from the decoder test vector storage 470 to the decoder 480. The activation of the egress homing sequence detection signal 468 also enables the decoder response capture 485 to begin capturing the output of the decoder 480, produced in response to the test vector data sequence generated by the decoder test vector storage 470. Upon generation of the complete test vector data sequence, the decoder test vector storage 470 activates the decoder test completion signal 469, which signals the decoder sequence detector 465 to return the egress homing sequence detection signal 468 to the inactive state. The return of egress homing sequence detection signal 468 to the inactive state causes the decoder test vector storage 470 to cease generating test vectors, the selector 475 to once again pass to the decoder 480 speech frames from compressed egress stream 460, and the decoder response capture 485 to cease capturing the output of the decoder 480. The contents of decoder response capture 485 may then be post-processed into a form suitable for comparison with the original decoder test vectors. Post-processing and analysis of the results may be done at the location where the equipment is installed, or remotely by transferring the information using conventional data transmission techniques (not shown).

If a subsequent instance of the decoder homing sequence is received by the decode sequence detector 465 immediately following the receipt of the decoder homing sequence, the decoder sequence detector 465 activates decoder loopback detection signal 467. Upon activation of decoder loopback detection signal 467, the encoder homing sequence storage 477 begins passing to the selector 487 the homing sequence for the encoder 420. The selector 487 passes the encoder homing sequence, unchanged, to PCM egress stream 490. Upon completion of the generation of the encoder homing sequence the encoder homing sequence storage 477 activates decoder homing sequence complete signal 466, signaling decoder sequence detector 465 to return decoder loopback detection signal 467 to the inactive state. Used in combination with a loopback connection (not shown) of PCM egress stream 490 to PCM ingress stream 450, the functionality just described permits an embodiment in accordance with the present invention to support remote testing of the decoder 480 and encoder 420.

In the ingress path of PVE 400, PCM speech data from the PCM ingress stream 450 is provided to both the encoder sequence detector 445 and the selector 430. In normal circumstances, the encoder loopback detection signal 447 and the ingress homing sequence detection signal 448 from the encoder sequence detector 445 are in the inactive state, causing the selector 430 to pass the speech data from the PCM ingress stream 450 unchanged to the encoder 420. The encoder 420 processes the incoming speech data according to any of a variety of encoding algorithms including, for example, those listed above with reference to the operation of the decoder 480. In the exemplary embodiment, encoder 420 produces compressed speech frames. The inactive state of ingress homing sequence detection signal 447 configures selector 427 to pass compressed speech frames for transmission via compressed egress stream 405. The compressed ingress stream 405 may then be packetized and transmitted, for example, by the remaining functions of the VHD 205 of FIG. 2. The encoder test vector storage 440 and the encoder response capture 410 are disabled by the normally inactive state of the egress homing sequence detection signal 448 from the encoder sequence detector 445. If enabled by the homing detection enable signal 408, the encoder sequence detector 445 compares the speech data within the PCM ingress stream 450 to a predefined decoder homing sequence. As in the case of the decoder, the encoder homing sequence is a selected string of data values that have a low probability of sequential occurrence within the speech data contained within the PCM ingress stream 450.

The first detection of the encoder homing sequence causes the encoder sequence detector 445 to activate the ingress homing sequence detection signal 448, which resets the encoder 420, restoring the algorithm within the encoder 420 to its initial or 'starting' state. The activation of the ingress homing sequence detection signal 448 also enables the encoder test vector storage 440 to generate the test vector data sequence appropriate for the encoding algorithm implemented by the encoder 420, and configures the selector 430 to pass the data output by the decoder test vector storage 440 to its output. In addition, the activation of the ingress homing sequence detection signal 448 enables the encoder response capture 410 to begin capturing the data output by the encoder 420, produced in response to the test vector data sequence generated by the encoder test vector storage 440. Completion of the test vector data sequence causes the encoder test vector storage 440 to activate the encoder test completion signal 449, which resets the encoder sequence detector 445 and restores the ingress homing sequence detection signal 448 to the inactive state. The return of ingress homing sequence detection signal 448 to the inactive state causes encoder test vector storage 440 to cease generating test vectors, the selector 430 to once again pass speech frames from PCM ingress stream 450, and the encoder response capture 410 to cease capturing the output of the encoder 420. The contents of the encoder response capture 410 may then be examined locally, or transferred to a remote location for analysis, using conventional data transmission techniques (not shown).

If a subsequent instance of the encoder homing sequence is received by the encoder sequence detector 445 immediately following the receipt of the encoder homing sequence, the encoder sequence detector 445 activates encoder loopback detection signal 447. Activation of the encoder loopback detection signal 447 causes the decoder homing sequence storage 432 to generate the homing sequence for the decoder 480. The selector 427 passes it without modification to compressed ingress stream 405. This capability permits an embodiment in accordance with the present invention to support remote testing of the decoder 480 and encoder 420 when used in combination with a loopback connection (not shown) of the compressed ingress stream 405 to the compressed egress stream 460.

Although the present invention has been described primarily with respect to its application to the encoding and decoding of voice communication, the present invention described herein is not limited only to use in voice communication systems. The inventive concepts illustrated above may also be applied to other communication modes as well, e.g. music, video, etc., without departing from the spirit or scope of the present invention.

Figure 5B:
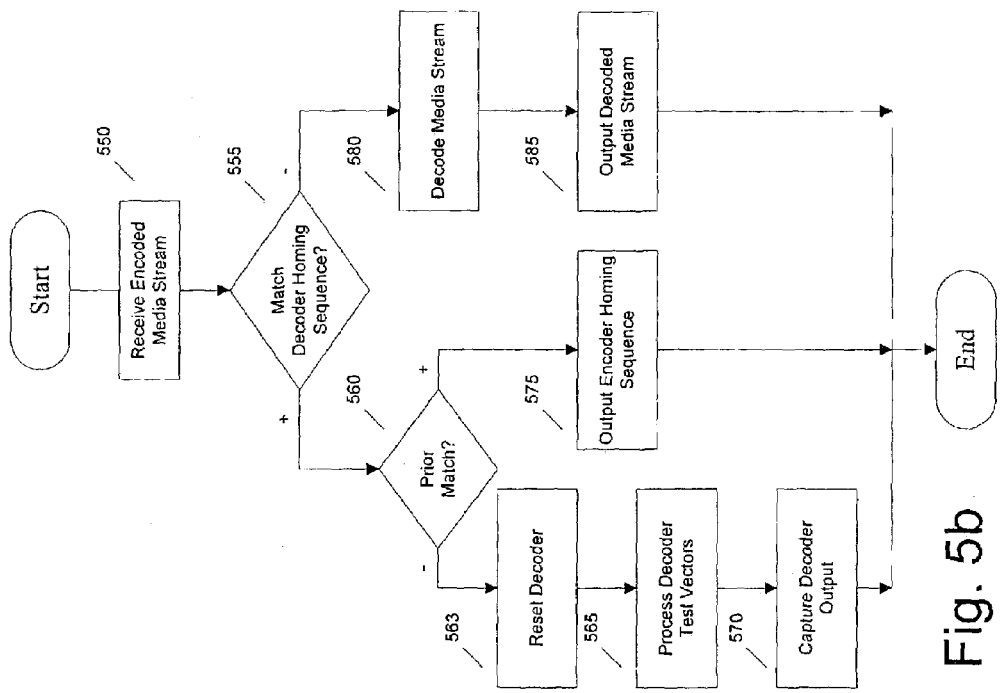
FIG. 5b is a flow diagram of a method of operating exemplary embodiment of a media decoder, in accordance with the present invention.
Figure 5A:
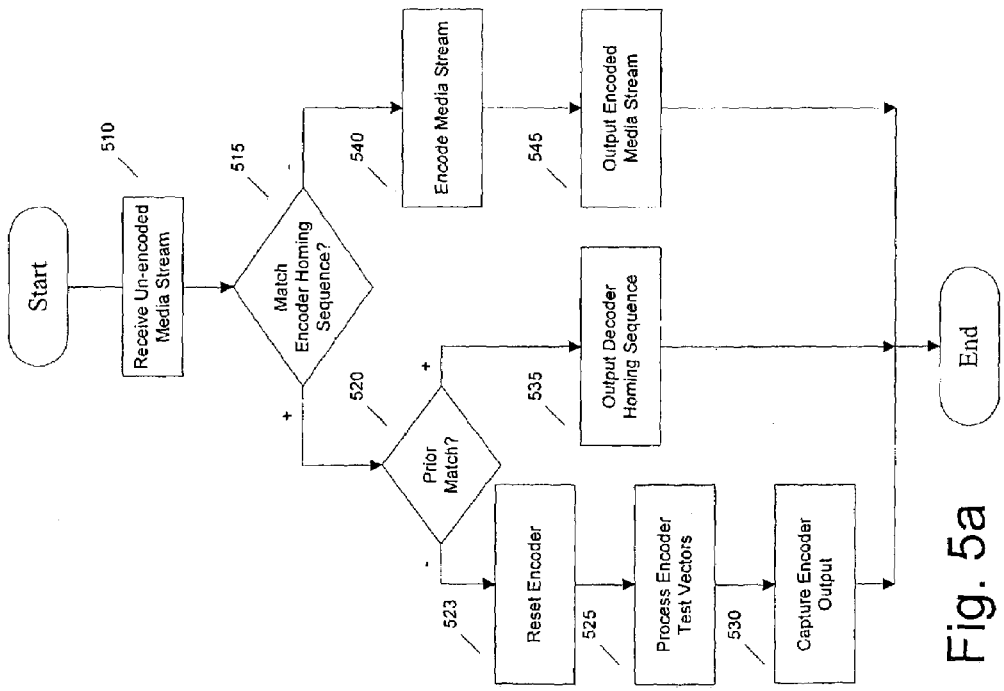
FIG. 5a is a flow diagram of a method of operating an exemplary embodiment of a media encoder, in accordance with the present invention.

FIG. 5a is a flow diagram of a method of operating an exemplary embodiment of a media encoder, in accordance with the present invention. As illustrated in FIG. 5a, an incoming un-encoded media stream is received (block 510) and the contents compared to the homing sequence for the encoder (block 515). If the contents of the media stream do not match the encoder homing sequence, the contents of the media stream is encoded (block 540) and output by the media coder (block 545).

If the contents of the media stream does match the encoder homing sequence, an additional test is made to determine if this is match is contiguous to a prior match of the un-encoded media stream with the encoder homing sequence (block 520). If a contiguous match is detected, the encoder outputs the homing sequence of the corresponding decoder (block 535). If, however, this match is a first match, the encoder is reset to its initial or starting state (block 523), the encoder is then passed the series of test vectors defined for the encoder (block 525), and the data output by the encoder is captured for later analysis (block 530).

FIG. 5b is a flow diagram of a method of operating exemplary embodiment of a media decoder, in accordance with the present invention. As shown in FIG. 5b, an incoming encoded media stream is received (block 550) and the contents of the media stream is compared to the homing sequence for the decoder (block 555). If the decoder homing sequence does not match the contents of the media stream, the media stream is decoded (block 580) and output by the media coder (block 585).

If the decoder homing sequence does not match the contents of the media stream, a further test is made to determine if this is a second or subsequent contiguous occurrence of the decoder homing sequence in the encoded media stream (block 560). If a contiguous match is detected, the decoder outputs the homing sequence of the corresponding encoder (block 575). If, however, this match is a first match, the decoder is reset to its initial or starting state (block 563), the decoder is then passed the series of test vectors defined for the decoder (block 565), and the data output by the decoder is captured for later analysis (block 570).

Figure 6:
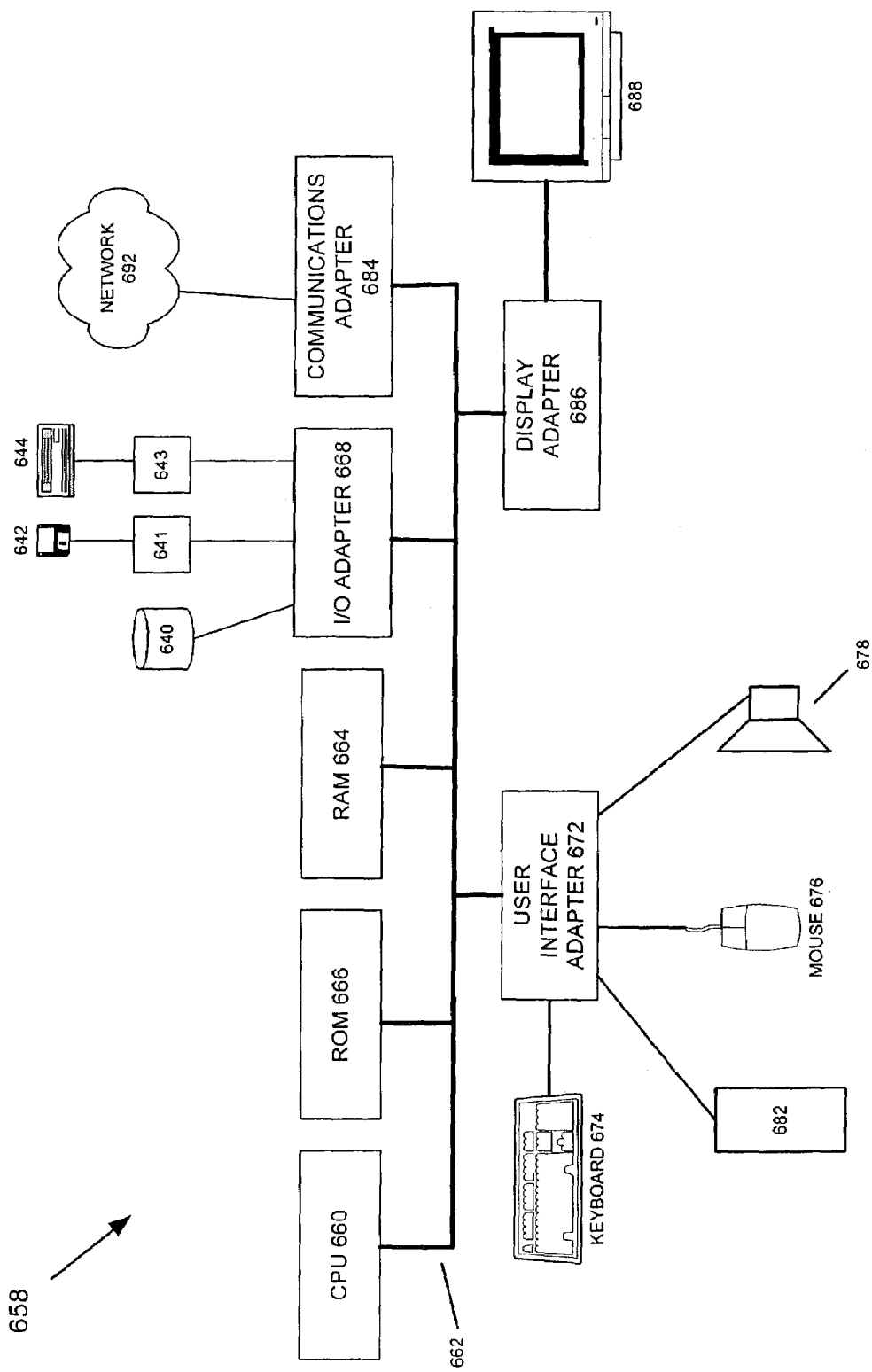
FIG. 6 shows a block diagram of an exemplary terminal in which an embodiment in accordance with the present invention may be practiced.

FIG. 6 shows a block diagram of an exemplary terminal 658 in which an embodiment in accordance with the present invention may be practiced. Terminal 658 may correspond, for example, to network gateways 12a, 12b, and 12c of FIG. 1, or 12a, 12b, 12c, and 12d of FIG. 1A, or telephony devices 13a, 13b, 13c, of FIG. 1 or 13a, 13b, 13c, and 13d of FIG. 1A. As illustrated in the exemplary embodiment of FIG. 6, a processor 660 is interconnected via system bus 662 to random access memory (RAM) 664, read only memory (ROM) 666, an input/output adapter 668, a user interface adapter 672, a communications adapter 684, and a display adapter 686. The input/output adapter 668 connects peripheral devices such as hard disc drive 640, floppy disc drives 641 for reading removable floppy discs 642, and optical disc drives 643 for reading removable optical disc 644. The user interface adapter 672 connects devices such as a keyboard 674, a speaker 678, and microphone 682 to the bus 662. The microphone 682 generates audio signals that are digitized by the user interface adapter 672. The speaker 678 receives audio signals that are converted from digital samples to analog signals by the user interface adapter 672. The display adapter 686 connects a display 688 to the bus 662. Embodiments of the present invention may also be practiced in other types of terminals as well, including but not limited to, a packet voice transceiver without a display adapter 686 or display 688, a hard disk drive 640, a floppy disk drive 641, nor optical disk drive 643, in which case the program instructions may be stored in ROM 666, or downloaded over communications adapter 684 and stored in RAM 664. An embodiment may also be practiced in, for example, a business or residential telephone with no display, a portable hand-held terminal with little or no display capability, in a consumer home entertainment system, or even in a multimedia game system console.

An embodiment of the present invention can be implemented as sets of instructions resident in the RAM 664 or ROM 666 of one or more terminals 668 configured generally as described in FIG. 6. Until required by the terminal 658, the set of instructions may be stored in another memory readable by the processor 660, such as hard disc drive 640, floppy disc 642, or optical disc 644. One skilled in the art would appreciate that the physical storage of the sets of instructions physically changes the medium upon which it is stored electrically, magnetically, or chemically so that the medium carries information readable by a processor.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A media encoding device comprising:
   a sequence detector for recognizing the occurrence of a predefined data sequence in a data stream, the sequence detector producing a detect signal upon recognition of the predefined data sequence;
   a selector for passing one of at least a first data stream and a second data stream to an output stream, the selector having a control input for controlling the selection, the control input operatively coupled to the detect signal of the sequence detector; and
   an encoder for converting an input data stream in a first representation to an output data stream in a second representation, the encoder having a reset input operatively coupled to the detect signal of the sequence detector.

2. The media encoding device of claim 1, the sequence detector further comprising an enable input for enabling the recognition of the predefined data sequence.

3. The media encoding device of claim 1 wherein the first data stream comprises data representative of human speech.

4. The media encoding device of claim 1 wherein the second data stream comprises a test data stream.

5. The media encoding device of claim 1 wherein the encoder output stream comprises compressed speech data.

6. The media encoding device of claim 5 wherein the encoder output is compliant with at least one of the ITU-T G.726 speech encoder specification, the ITU-T G.723.1 speech encoder specification, and ETSI EN 301 703 Adaptive Multi-Rate speech encoder specification.

7. The media encoding device of claim 1 further comprising an output store for capturing the encoder output data stream for a predetermined interval following the occurrence of the detect signal.

8. The media encoding device of claim 1 wherein the sequence detector produces a second detect signal upon recognition of a subsequent occurrence of the predefined sequence immediately following recognition of a prior occurrence of the predefined sequence.

9. A media decoding device comprising:
- a sequence detector for recognizing the occurrence of a predefined data sequence in a data stream, the sequence detector producing a detect signal upon recognition of the predefined data sequence;
- a selector for passing one of at least a first data stream and a second data stream to an output stream, the selector having a control input for controlling the selection, the control input operatively coupled to the detect signal of the sequence detector; and
- a decoder for converting an input data stream in a first representation to an output data stream in a second representation, the decoder having a reset input operatively coupled to the detect signal of the sequence detector.

10. The media decoding device of claim 9, the sequence detector further comprising an enable input for enabling the recognition of the predefined data sequence.

11. The media decoding device of claim 9 wherein the first data stream comprises compressed speech data.

12. The media decoding device of claim 9 wherein the second data stream comprises a test data stream.

13. The media decoding device of claim 9 wherein the decoder output stream comprises data representative of human speech.

14. The media decoding device of claim 13 wherein the decoder input is compliant with at least one of the ITU-T G.726 speech decoder specification, the ITU-T G.723.1 speech decoder specification, and the ETSI EN 301 703 Adaptive Multi-Rate speech encoder specification.

15. The media decoding device of claim 9 further comprising an output store for capturing the decoder output data stream for a predetermined interval following the occurrence of the detect signal.

16. The media decoding device of claim 9 wherein the sequence detector produces a second detect signal upon recognition of a subsequent occurrence of the predefined sequence immediately following recognition of a prior occurrence of the predefined sequence.

* * * * *